INVENTOR.
Beverly W. Keese
BY Strauch & Hoffman
Attorneys

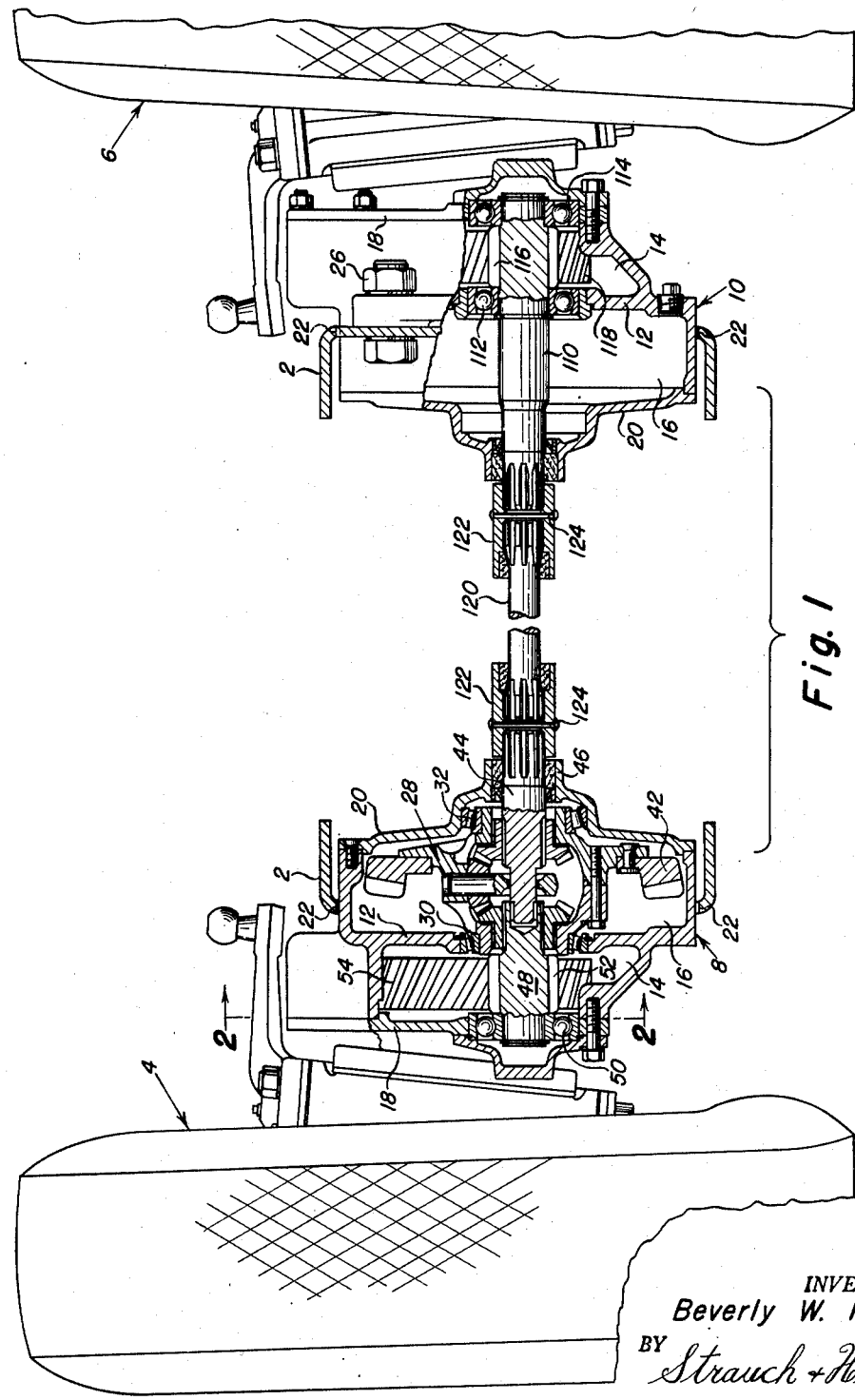

Patented Dec. 30, 1952

2,623,604

UNITED STATES PATENT OFFICE 2,623,604

STEERABLE WHEEL DRIVE AND MOUNTING

Beverly W. Keese, Oshkosh, Wis., assignor to The Timken-Detroit Axle Company, Detroit, Mich., a corporation of Ohio Application June 10, 1948, Serial No. 32,205

7 Claims. (Cl. 180—43)

This invention relates to motor vehicle drive mechanism and has for its general object and purpose to provide a novel mounting and arrangement of the drive mechanism for a vehicle such as a mine shuttle car which will permit the use of a car body of maximum load capacity while insuring safe mine shaft clearances of the vehicle drive wheels.

It is a more particular object of the invention to provide a compact mounting and arrangement of individual drive wheel assemblies of the steerable type on opposite sides of the vehicle frame with inter-connected drive gearing for said wheels whereby the spacing of the drive wheels from the sides of the vehicle frame is reduced to a minimum.

It is a further object of the invention to provide supporting structures for the steerable drive wheels and the associated drive gearing therefor of novel construction, which are so mounted and arranged on opposite sides of the vehicle frame as to provide a substantially transversely balanced distribution of the weight.

It is an additional object of my invention to provide vehicle drive mechanism as above characterized, in which the drive gearing for one of the vehicle wheels includes a differential unit and drive shaft connection to the motor, located substantially in the vertical plane of one of the side rails of the vehicle frame whereby the distorting effect of driving torque forces on the vehicle frame structure is reduced to a minimum.

It is also the purpose of the present invention to provide a steerable drive wheel assembly comprising a minimum number of elements of simple, structurally durable form, highly efficient in functional operation, and which may be inexpensively fabricated and easily assembled in proper cooperative relation.

With the above and other objects in view, the invention comprises the improved motor vehicle drive mechanism, and the construction and relative arrangement of the several parts as will hereinafter be more fully described, illustrated in the accompanying drawings and subsequently incorporated in the sub-joined claims.

In the drawings wherein similar reference characters designate corresponding parts throughout the several views;

Figure 1 is a transverse sectional view, partly in elevation, showing the interconnected drive gearing for a pair of steerable drive wheels mounted on opposite sides of the vehicle frame;

Referring in further detail to the drawings, the vehicle frame may be of general conventional form and includes the side rails 2 upon each of which a drive wheel assembly 4 and 6 respectively is mounted, the drive wheel, in the present instance being of the steerable type.

Figure 3:
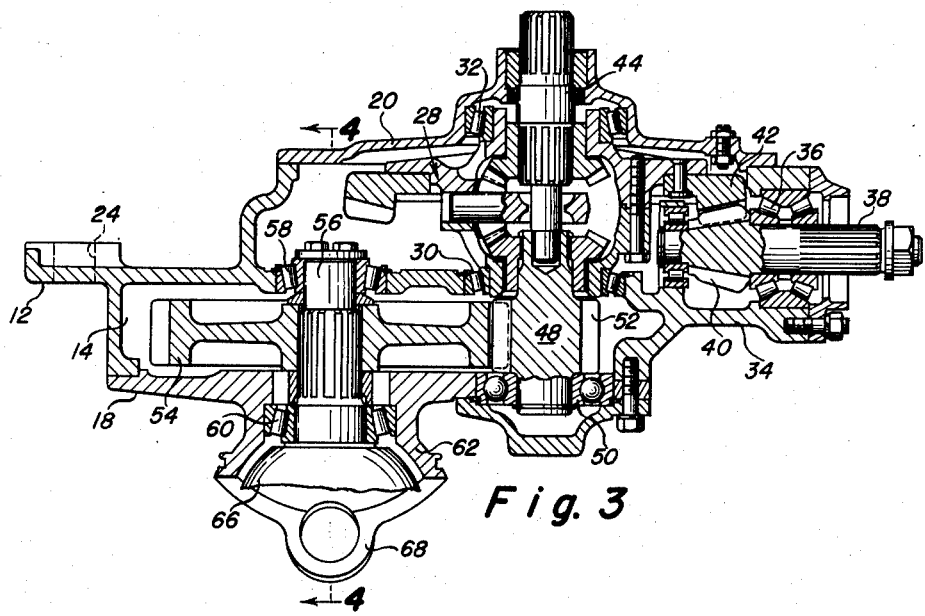
Figure 3 is a horizontal sectional view taken substantially on the line 3—3 of Figure 2.
Figure 2:
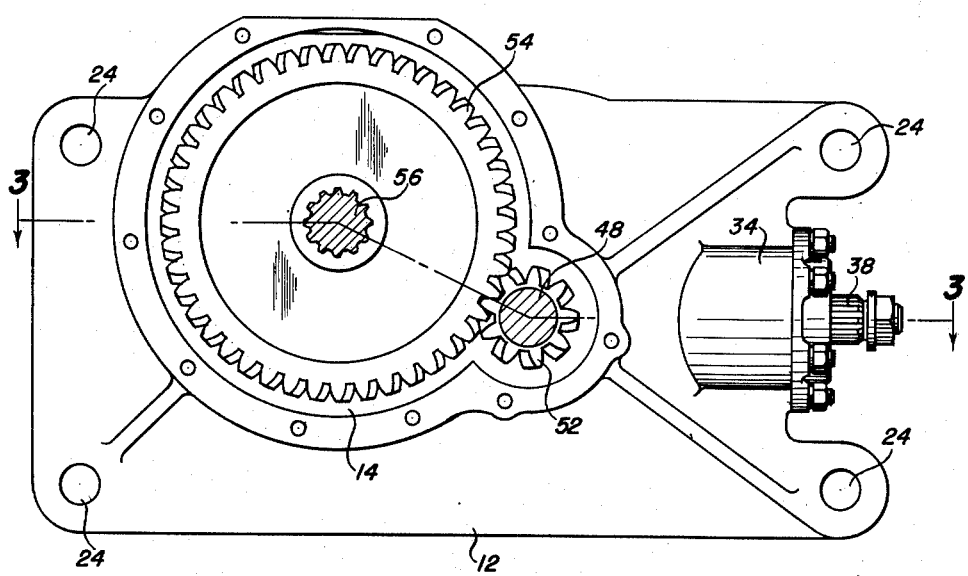
Figure 2 is a vertical section taken substantially on the line 2—2 of Figure 1.

With more particular reference to Figures 1 and 3 of the drawings, it will be noted that each wheel, with its associated drive gearing, is mounted upon a supporting structure or frame bracket 8 and 10 respectively, said brackets being of generally similar cross-sectional form. Each of these brackets has a vertical body wall 12 having a gear reduction housing chamber 14 integrally formed with one side of said wall, and a second housing chamber 16 integrally formed with the opposite side of said wall. The open sides of these chambers 14 and 16 are closed by the cover plates 18 and 20 respectively.

Each frame rail 2 is provided in the vertical web thereof with a longitudinally elongated opening 22 through which the wall of housing chamber 16 is inserted from the outer side of the frame and vertically spaced openings 24 in opposite ends of the bracket wall 12 register with similar openings in the frame to receive suitable attaching bolts 26 whereby the bracket is rigidly secured to the frame rail.

The chamber 16 of bracket 8 houses a conventional type of differential drive mechanism generally indicated at 28 which is journalled in suitable bearings 30 and 32 respectively mounted in bracket wall 12 and cover member 20.

The bracket wall 12 at one end and the wall of differential housing chamber 16 are formed with a hollow boss 34 in which a suitable bearing 36 is mounted for the differential pinion drive shaft 38 having the integral pinion 40 on one end in constant mesh with the ring gear 42 of the differential mechanism and extending therefrom in longitudinal parallel relation with the frame rail 2. A suitable type of motor (not shown) is drivingly connected in any approved manner with the other end of the pinion shaft 38.

As seen in Figure 1 of the drawings, the inner or right-hand side gear of the differential mechanism is drivingly connected with a stub shaft 44 which extends through the bearing boss 46 on cover member 20. The other side gear of the differential mechanism is drivingly connected with one end of a shaft 48 which axially extends through the reduction gear chamber 14 and at its other end is journalled in the bearing 50 mounted in the cover member 18 for the chamber 14. This shaft 48 is provided with an integrally formed helical pinion 52 in constant mesh with the large diameter reduction gear 54. Preferably the axis of gear 54 is spaced longitudinally from the axis of pinion 52 and above the horizontal plane thereof.

Figure 4:
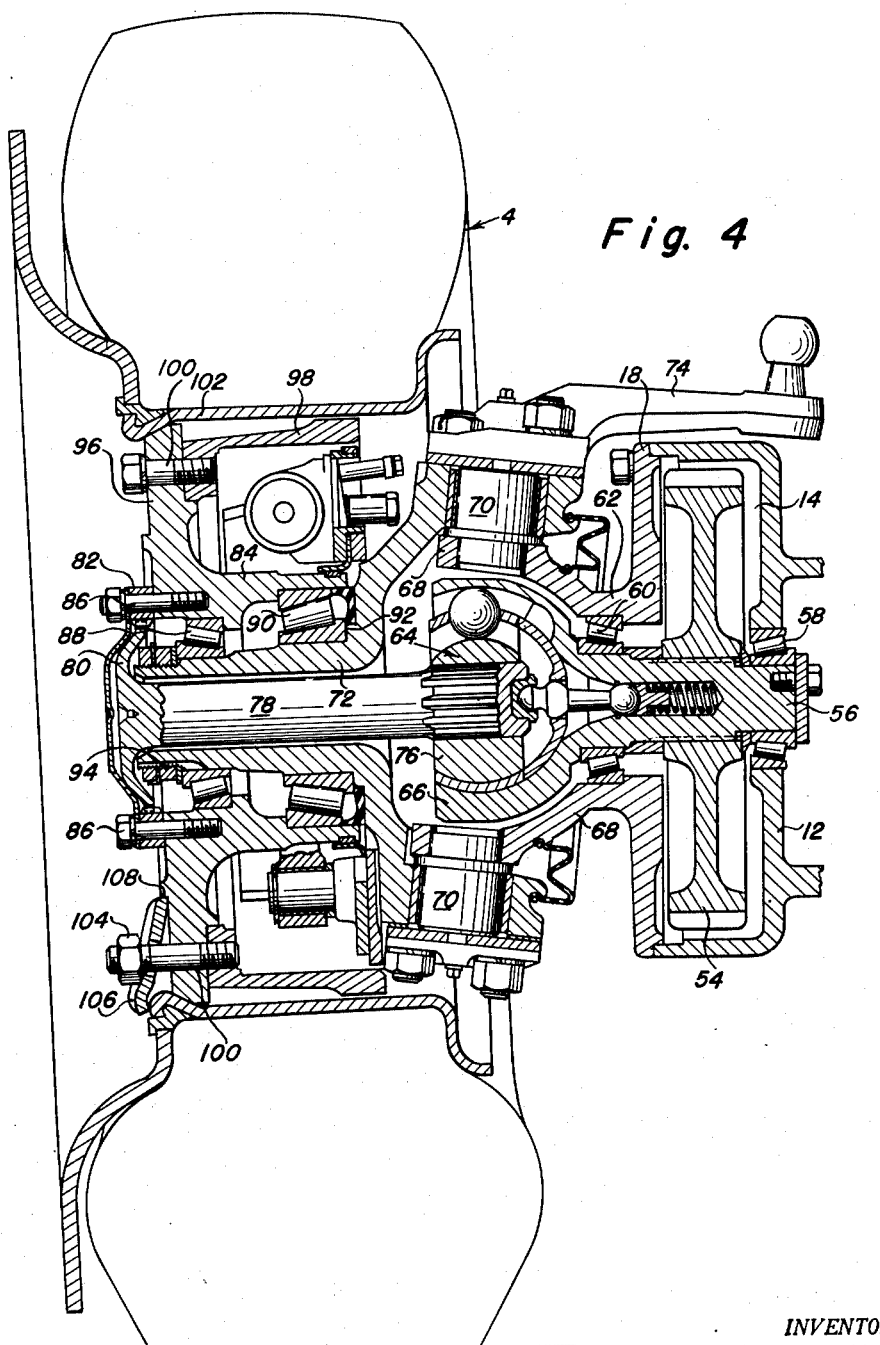
Figure 4 is a vertical sectional view taken substantially on the line 4—4 of Figure 3 illustrating the construction and mounting of the steerable wheel upon the frame bracket structure.

As seen in Figures 3 and 4 of the drawings, reduction gear 54 is non-rotatably secured to a shaft 56 which is journalled at one end in a bearing 58 mounted in the bracket wall 12. Shaft 56 at its other end is journalled in a bearing 60 mounted in an externally projecting boss 62 on the cover member 18 and is formed with the socket portion 66 of a constant velocity type universal joint, generally indicated at 64. Above and below the socket portion 66 arms 68 are integrally formed with bearing boss 62 on the cover member 18. In these arms one end of the axially alined trunnion pins 70 are welded or otherwise rigidly secured. A wheel spindle 72 is pivotally mounted upon the pins 70 for steering movement in a substantially horizontal plane and to the inner end of this spindle, in coaxial relation with the pins 70 one end of the steering arm 74 is rigidly secured in conventional manner.

The ball portions 76 of the universal joint are non-rotatably connected to the inner end of a stub shaft 78 which extends outwardly through the spindle 72 and externally of said spindle is formed with an annular flange 80 having peripheral teeth thereon for locking engagement with similar teeth internally formed on a ring or annulus 82 rigidly secured to the outer end face of the wheel hub 84 by means of the stud bolts 86.

The wheel hub 84 is journalled upon the spindle 72 by axially spaced bearings 88 and 90 for free rotation relative to said spindle and is held against axial movement between the shoulder 92 formed on the inner end of spindle and the adjustable nut 94 threaded on the outer end of the spindle having bearing engagement with the inner race ring of the bearing 88.

At its outer end, the wheel hub 84 is formed with a radially extending flange 96 and to the inner face of this flange a brake drum 98 is rigidly secured by the bolts 100.

The hub flange 96 constitutes the sole support for the wheel tire rim 102. Certain of the bolts 100 are relatively long and carry the adjustable nuts 104 coacting with lugs 106 bearing at their ends against a shoulder 108 on flange 96 and the rim 102 to non-rotatably clamp and secure the tire rim in rigidly fixed relation to the hub flange 96.

Conventional brake shoes and actuating means therefor are suitably mounted within the brake drum 98 and operate in the usual manner to retard or stop rotation of the vehicle wheel.

From reference to Figure 4 of the drawings, it will be noted that the steerable stub shaft 78 is of relatively small diameter, thus enabling wheel bearings 88 and 90 of adequate size to be economically employed with a wheel hub of minimum diameter. It will further be seen that by providing the flange 96 on the outer end of wheel hub, a brake drum 98 may be used having a maximum width for a given length of the stub shaft 78.

The other steerable drive wheel assembly 6 is mounted on the opposite side rail of the vehicle frame substantially in the manner above described except that the differential unit and the pinion drive shaft 38 of the wheel assembly 4 is omitted. A continuous power input shaft 110 extends through the empty housing chamber 16 of the supporting bracket structure 10 as well as the gear reduction chamber 14 thereof and is journalled in bearings 112 and 114 mounted in the body wall 12 and cover member 18 respectively of said bracket structure. Between these bearings, the shaft 110 is provided with a helical drive pinion 116 in constant mesh with the large reduction gear 118, corresponding to the gear 54 of wheel assembly 4.

The axially alined shafts 44 and 110 of the drive wheel assemblies are interconnected by a transmission drive shaft 120 and internally splined coupling sleeves 122 loosely coacting with mating splines formed on the ends of shaft 120 and shafts 44 and 110. Axial movement of the coupling sleeves relative to the shaft members is limited by the pins 124 which extend diametrically through the respective coupling members between the opposed ends of the shafts. The loosely splined connection of the coupling sleeves with the shaft ends permits of a slight relative angular movement of the shafts 44 and 110 relative to the connecting drive shaft 120.

From the above description, it will be seen that I have provided a vehicle drive mechanism which is admirably adapted to use on mine shuttle cars and other vehicles where limitation of the overall width of the vehicle is imperative, by reason of the particular locale in which the vehicle must be operated. By means of the present invention, such vehicles may be provided with steerable driving wheels without sacrifice of the load carrying capacity of the car body or requiring a non-conventional construction thereof. This desirable result is obtained by reason of the novel supporting bracket structures for the respective wheels and their drive gearing and the mounting of said bracket structures upon the opposite side rails of the vehicle frame. Thus it will be noted that the lateral spacing of these wheels from the frame rails is reduced to a minimum while permitting the required angular steering movement of the wheels.

It will further be seen that there is a substantially balanced transverse distribution of the weight of the drive wheel assemblies upon the vehicle frame structure. Also, by locating the differential unit and its drive shaft 38 substantially in the vertical plane of one of the vehicle side rails 2 the distorting effect of driving torque forces upon the frame structure is minimized so that a sturdy frame of comparatively light weight may be employed. Also the frame rail affords additional protection for the differential unit in the event of collision or other accident, so that repair or replacement expense will be comparatively small.

Finally, it will be noted that the individual drive wheel assemblies comprise a compact and efficiently functioning combination of simple and durable structural elements and that either wheel assembly may be readily removed from its mounted position on the frame structure and disconnected from the drive shaft 120, independently of the other wheel assembly, by merely removing the bracket attaching bolts 26.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a vehicle frame having parallel longitudinal vertical side rail walls provided with transversely aligned apertures, a steerable traction wheel and power driven gearing therefor at each side of said frame, a common supporting bracket structure for each wheel and its drive gearing at each side of the frame, means for rigidly mounting said bracket structures directly on the respective frame rail walls and projecting within said apertures, a reduction gear housing in each bracket disposed laterally outwardly of the associated frame rail wall, another housing in each said bracket with its major portion disposed laterally inwardly of the associated frame rail wall, power driven differential gearing mounted in one of said other housing portions, and a drive shaft for said differential gearing journaled on the bracket housing the differential gearing inwardly of the associated frame rail wall.

2. In drive mechanism for motor vehicles, a longitudinal frame member having a vertical web, wheel supporting bracket structure comprising a vertical body wall located adjacent the outer surface of said web and attached directly to said web and having integrally formed housings on opposite sides of said web, a power driven differential unit mounted in the inner of said housings, a removable cover plate closing the outer housing, and final wheel drive gearing mounted in the outer housing including a drive pinion drivingly connected with said differential unit and journalled in said cover plate and the bracket body wall.

3. Drive mechanism as defined by claim 2, wherein said wheel drive gearing also includes a rotatable spur gear in mesh with said pinion and having a wheel driving shaft journalled in said bracket body wall and housing cover plate.

4. In a vehicle, a frame having at one side a longitudinal rail having a vertical web formed with an aperture, a frame supporting wheel adjacent said rail, a wheel attached bracket extending alongside and secured upon said rail, said bracket having a housing portion projecting inwardly through an aperture in said rail and an oppositely projecting housing portion, differential mechanism within said first housing portion having its vertical center line located laterally inwardly of said rail web, a motor driven shaft connected to said differential mechanism, and reduction gearing within said oppositely projecting housing portion operatively connected to said differntial mechanism and to said wheel.

5. In the vehicle defined in claim 4, said vehicle having a second longitudinal frame rail at the other side, a second bracket secured to said second rail also having a housing portion projecting through an aperture therein and an oppositely projecting second housing portion containing wheel connected reduction gearing, and a transverse shaft connecting said differential mechanism to said second reduction gearing.

6. In drive mechanism for motor vehicles having a frame with opposite vertical side walls, aligned openings in said side walls, a power driven wheel adjacent each of the outer surfaces of said side walls, a pair of wheel supporting bracket structures, one of said structures for each wheel and each of said structures supporting the associated wheel from said frame, each wheel supporting bracket structure comprising a body wall adapted to be attached to a corresponding side wall and closing the opening therein and said body wall further having integrally formed housings on opposite sides thereof, one of said housings projecting through the coresponding opening in said frame, a power driven differential unit mounted in the inner of said housings, a removable cover plate closing the outer housing, and final wheel driving gearing mounted in the outer housing including a drive pinion drivingly connected with said differential unit and journalled in said cover plate and the bracket body wall, a rotatably spur gear in mesh with said pinion and a wheel driving shaft journalled in said bracket body wall and housing cover plate.

7. In drive mechanism for motor vehicles having a frame with opposite vertical side walls, transversely aligned openings in said side walls, a power driven wheel adjacent each of the outer surfaces of said side walls, a pair of wheel supporting bracket structures, one of said structures for each wheel and each of said structures connecting the associated wheel to said frame, each wheel supporting bracket structure comprising a body wall attached to a corresponding frame side wall and said bracket structure projecting through the opening therein and said body wall further having housings projecting from opposite sides thereof, one of said housings having a portion of major diameter projecting inwardly through the opening in its associated frame side wall, a power driven differential unit mounted in said inner housing of one of said bracket structures, a removable cover plate closing the outer housing, and final wheel driving gearing mounted in the outer housing including a drive pinion drivingly connected with said differential unit and rotatably supported in said cover plate and the bracket body wall, a rotatable gear in mesh with said pinion and a wheel driving shaft carrying said gear rotatably supported on said bracket body wall and said cover plate.

BEVERLY W. KEESE.

REFERENCES CITED

The following references are of record in the file of this patent:

UNITED STATES PATENTS

| Number | Name | Date |
| --- | --- | --- |
| 1,429,989 | Whitehead | Sept. 26, 1922 |
| 1,810,635 | White | June 16, 1931 |
| 2,381,672 | Lee | Aug. 7, 1945 |
| 2,415,596 | Larison | Feb. 11, 1947 |
| 2,457,569 | Lee | Dec. 28, 1948 |

FOREIGN PATENTS

| Number | Country | Date |
| --- | --- | --- |
| 523,654 | Great Britain | July 19, 1940 |